United States Patent
Maleus

(10) Patent No.: US 7,638,974 B2
(45) Date of Patent: Dec. 29, 2009

(54) METHOD AND DEVICE FOR MANAGING BATTERIES OF A BATTERY SYSTEM

(75) Inventor: Börje Maleus, Järfälla (SE)

(73) Assignee: Creator Teknisk Utveckling AB, Vikmanshyttan (SE)

( * ) Notice: Subject to any disclaimer, the term of this patent is extended or adjusted under 35 U.S.C. 154(b) by 211 days.

(21) Appl. No.: 10/566,683

(22) PCT Filed: Dec. 3, 2004

(86) PCT No.: PCT/SE2004/001797
§ 371 (c)(1),
(2), (4) Date: Apr. 11, 2006

(87) PCT Pub. No.: WO2005/055391
PCT Pub. Date: Jun. 16, 2005

(65) Prior Publication Data
US 2006/0192528 A1    Aug. 31, 2006

(30) Foreign Application Priority Data
Dec. 3, 2003   (SE) .................................... 0303246

(51) Int. Cl.
*H02J 7/00* (2006.01)
(52) U.S. Cl. .................... 320/119; 320/116; 320/118
(58) Field of Classification Search ................. 320/104, 320/116, 118, 119
See application file for complete search history.

(56) References Cited

U.S. PATENT DOCUMENTS

| 5,656,920 | A | 8/1997 | Cherng et al. |
| 6,046,573 | A | 4/2000 | Wikström |
| 6,275,004 | B1 * | 8/2001 | Tamai et al. ................. 320/118 |
| 6,545,445 | B1 * | 4/2003 | McDermott et al. ......... 320/103 |

OTHER PUBLICATIONS

International Search Report of PCT/SE2004/001797, mailed Mar. 8, 2005.

* cited by examiner

*Primary Examiner*—Edward Tso
*Assistant Examiner*—Richard V Muralidar
(74) *Attorney, Agent, or Firm*—Nixon & Vanderhye P.C.

(57) ABSTRACT

Method for managing a battery system including a number of serially coupled batteries in a flexible, reliable, and cost effective way and that can be used in a wide variety of applications, such as tools, for example, hand tools, cars, boats, back-up systems, buses, trucks, golf carts, wheel chairs, electric cars and fork-lift trucks. The method includes the steps of detecting the battery voltage over each individual battery of the battery system; and utilizing a voltage imbalance between different batteries of the system during operation of the battery system. Furthermore, the method controls the voltage distribution of the batteries to create a voltage imbalance between different batteries of the battery system.

19 Claims, 6 Drawing Sheets

METHOD AND DEVICE FOR MANAGING BATTERIES OF A BATTERY SYSTEM

This application is the US national phase of international application PCT/SE2004/001797, filed 3 Dec. 2004, which designated the U.S. and claims priority of SE 0303246-3, filed 3 Dec. 2003, the entire contents of each of which are hereby incorporated by reference.

TECHNICAL FIELD

The present invention relates to a method and device for managing batteries of a battery system in a flexible, reliable, and cost effective way and that can be used in a wide variety of applications, such as tools, for example, hand tools, cars, boats, back-up systems, buses, trucks, golf carts, wheel chairs, electric cars and fork-lift trucks. The invention further relates to a computer readable medium comprising instructions for bringing a computer to perform such a method.

BACKGROUND

Series connected battery strings or batteries wired in series are used in a large number of applications and a large number of different vehicles, such as cars, boats, back-up systems, buses, trucks, golf carts, wheel chairs, electric cars and fork-lift trucks. Charging and discharging of such series connected batteries will inevitably result in a variance in voltage between different batteries in the string. If this difference is not corrected it will lead to an undercharging of some batteries and an overcharging of other during the charging of the batteries. This imbalance entails sulphating for lead-acid batteries (caused by undercharging) and drying up (caused by overcharging), which, in turn, will lead to that the charging level of the batteries will be below 100%, i.e. the batteries are not completely charged, and to a shortened duration of the batteries or even to battery damage. The charge process is also slowed down when the battery is reaching 100% state of charge due to apparent high voltage of the battery. The voltage difference which forces energy from the charge device to the battery is therefore reduced.

In order to avoid or prevent this voltage variance or imbalance between the batteries, a number of solutions have been proposed. A common approach is equalization, which is a technique that reduces the imbalances between the batteries aiming at equalizing the voltages of the different batteries of the string. Normally, an extended charging at a cyclic voltage or a low constant charging current is applied during an extended period of time at amplified voltages, thereby power from a battery with a higher voltage is shuffled to a battery with a lower voltage until they have an approximately equal voltage.

Another frequently utilized approach is to use a so called booster, which apply a voltage boost. This device increases the voltage to such a level that the charging is more efficient. It could however not handle the difference between different batteries in a string. Such a device is expensive if it is arranged to handle higher currents than approximately 8-12 A. In many applications, for example, buses, trucks, or fork-lift trucks current of approximately 100 A or more is common.

A third approach is to use a multi-stage generator in the engine. This type of generator could provide a controlled charge algorithm, but they are rather expensive. Furthermore, under certain conditions, it is preferred that the temperature at the battery is known in order to be able to apply a suitable charging current thus an additional temperature sensor must be located at the batteries and the temperature data must be transferred from the batteries to the generator. In many applications the temperature difference between the temperature at the batteries and the temperature at the generator can be forty degrees ° C. or more. Taken together this entails a complex construction and high costs as well as it may induce sensing errors.

Thus it is difficult to find a method and a device that provides a flexible, and reliable handling of the batteries of a battery string at a low cost and that can be used in a wide variety of applications, such as buses, trucks, golf carts, wheel chairs, electric cars and fork-lift trucks, etc.

SUMMMARY

An object is to provide a method and device for managing batteries of a battery system in a flexible, reliable, and cost effective way and that can be used in a wide variety of applications, such as tools, for example, hand tools, cars, boats, back-up systems, buses, trucks, golf carts, wheel chairs, electric cars and fork-lift trucks, etc.

The term battery refers to one cell or several cells connected in series.

According to a first aspect of the technology, there is provided a method for managing a battery system including a number of batteries. The method comprises the steps of detecting the battery voltage in the batteries of the battery system and utilizing a voltage imbalance between different batteries of the system during operation of the battery system.

According to a second aspect of the technology, there is provided a device for managing a battery system including a number of serially-coupled batteries. The device comprises a voltage detector connected to said battery system and arranged to detect the battery voltage the batteries of the battery system; a DC-to-DC-converter connected to said battery system; and a controller connected to said voltage detector and to said DC-to-DC-converter and being arranged to control the voltage distribution over the batteries of the battery system via said DC-to-DC-converter.

According to another aspect, there is provided a computer readable medium comprising instructions for bringing a computer to perform the method according to the first aspect.

The technology is based on the idea of utilizing a voltage variance or imbalance between batteries of battery system including a number of serially connected batteries for the management of the system. The technology provides a high degree of flexibility, and can be used in large number of applications, such as tools, for example, hand tools, in vehicles such as buses, trucks, golf carts, wheel chairs, electric cars and fork-lift trucks, etc., without requiring any major modifications. The technology can also be used in a wide variety of different types of batteries, for example, lead-acid batteries NiCd batteries, LiIon batteries, or NiMH batteries. Moreover, it can handle a very broad spectrum of currents. The design is simple and can therefore be realised in a cost effective manner.

According to a preferred example embodiment, a voltage imbalance between different batteries of the battery system is created and utilized during the operation of the battery system. This can be useful in certain operations, for example, during the charging of the batteries of the battery system. Thereby, the charging can be performed significantly faster since the charging is performed at a higher voltage, i.e. using the voltage difference. In another example embodiment, a detected voltage imbalance between the different batteries of the system is enhanced. This can also be useful, for example, during the charging of the batteries of the battery system in order to speed up the charging of the batteries.

According to a preferred example embodiment, a switching or alternating between batteries of the battery system having different voltages during predetermined intervals is performed during the operation of the batteries.

Furthermore, technology is also flexible in that it can use a voltage imbalance, created deliberately or detected, to improve the function of the battery system and the vehicle in which the system is mounted in dependence of external or environmental conditions. Accordingly, the technology can adapt the operation or functioning of the battery system to the conditions present.

According to an example embodiment, the device includes a temperature sensor the sense the temperature at the batteries of the battery system, thereby the operation or functioning of the battery system and the vehicle can be adapted to the external temperature. This is of a great benefit under warm as well as cold conditions and, in particular, in area where the temperature can vary to large extent. The device can also be used to provide other voltages from a battery. For example, 12V can be obtained from a 24V battery.

As realized by the person skilled in the art, the method as well as preferred example embodiments, are suitable to realize as a computer program or a computer readable medium.

DETAILED DESCRIPTION

Figure 1:
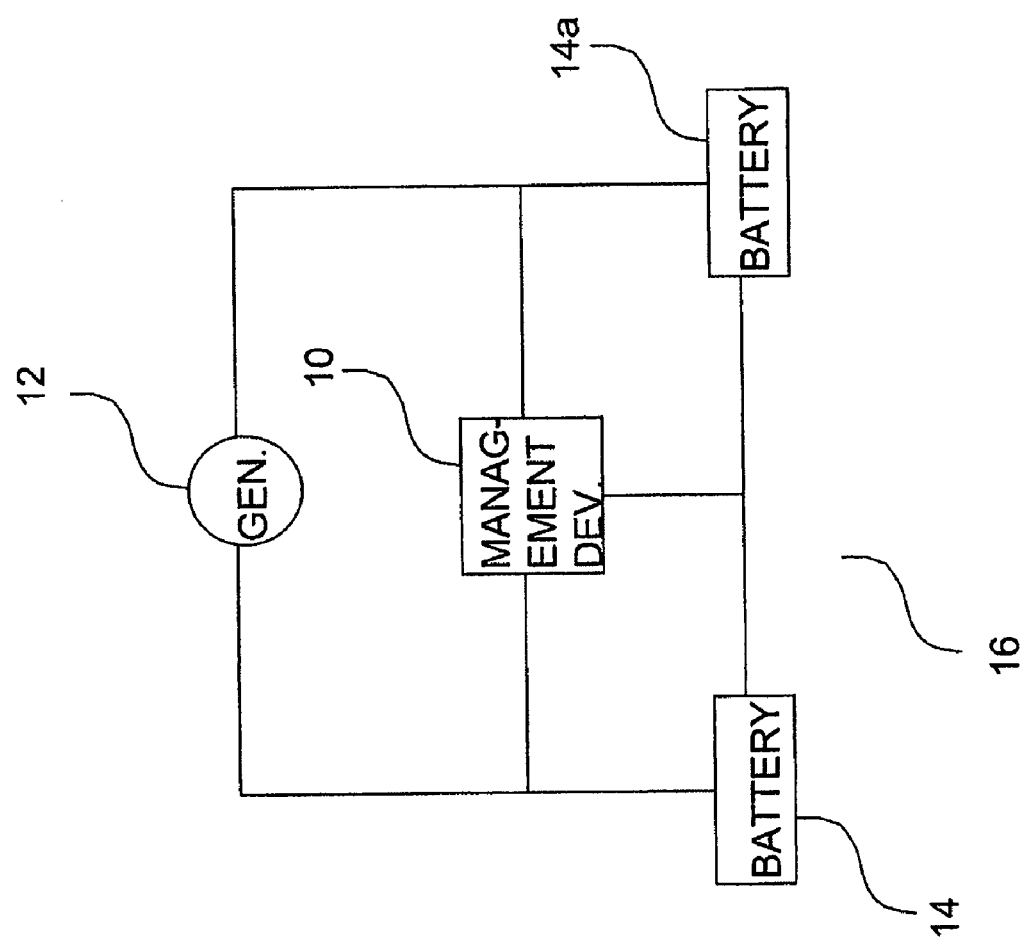
FIG. 1 shows schematically a battery system managing device of a first example embodiment connected to a generator of a vehicle and to a battery system of two serially connected batteries.

With reference first to FIG. 1, a battery system managing device of a first example embodiment connected to a generator, alternator or other type of charging device and to a battery system of two serially connected batteries will be shown schematically. A battery system management device 10 is connected to a generator 12 of a vehicle (not shown), such as a bus, a truck, a golf cart, a wheel chair, an electric car, or a fork-lift truck, and over the batteries 14, 14a respectively, of the battery system string 16. In this embodiment, the generator is of 28V and the voltage of the batteries 14, 14a are of 14V each. The open circuit voltage over each battery is typically lower than 14V. As discussed above, the charging and discharging of such series connected batteries results, in conventional applications, in slow charging when the batteries are close to 100% state of charge and/or a voltage imbalance between the batteries. Thus, the actual voltages over the batteries 14, 14a may drift so that the voltage over the first battery 14 could be 14.5V or higher and the voltage over the second battery is 13.5V or lower, or vice versa.

Figure 2:
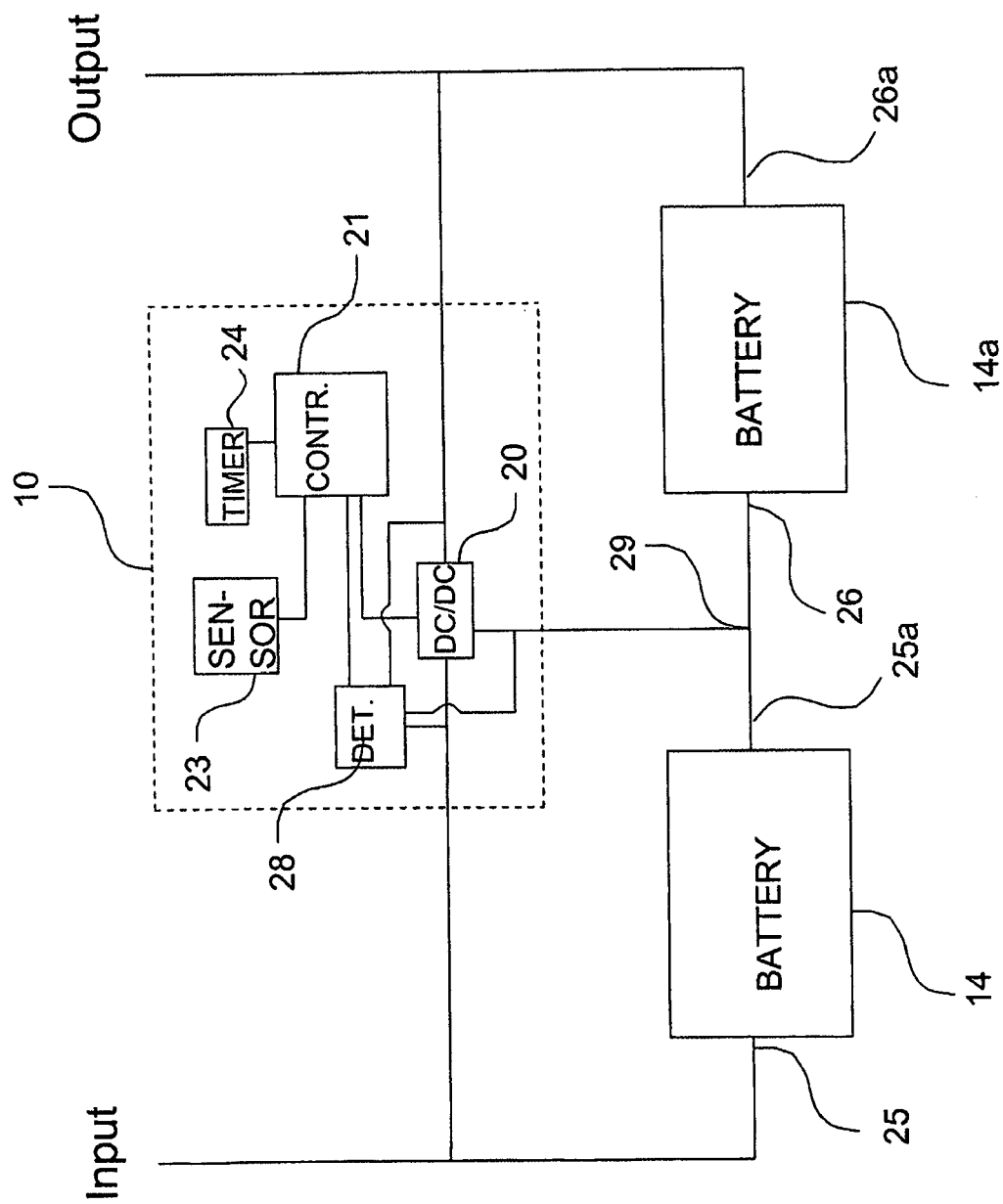
FIG. 2 shows schematically the battery system managing device of FIG. 1 in more detail.

Turning now to FIG. 2, the battery system managing device of FIG. 1 will be shown in more detail. The battery system managing device 10 comprises a DC-to-DC-converter 20, a controller 21, a sensing or detecting device 23 for sensing or detecting a battery parameter, and a timer unit 24. In this embodiment, the sensing device 23 is a temperature sensor for sensing the temperature at the batteries. In certain applications, this sensor is not built-in in the battery managing device 10, but placed at a distance from the device itself and wired to the device. In other applications a number of sensors are used in order to sense more than one parameter. For example, a sensor can be arranged to sense the battery type or the charge level of a battery.

A voltage detector 28 is further connected to the controller 21 and to the batteries 14, 14a to detect the voltage over respective battery 14, 14a. According to other embodiments, the voltage detector 28 can be incorporated in the DC-to-DC-converter 20. Moreover, a power supply (not shown) is included to power the components of the managing device 10, for example, the controller 21 and the DC-to-DC-converter 20. However, according to an alternative, the device can be powered by the main supply.

Figure 3:
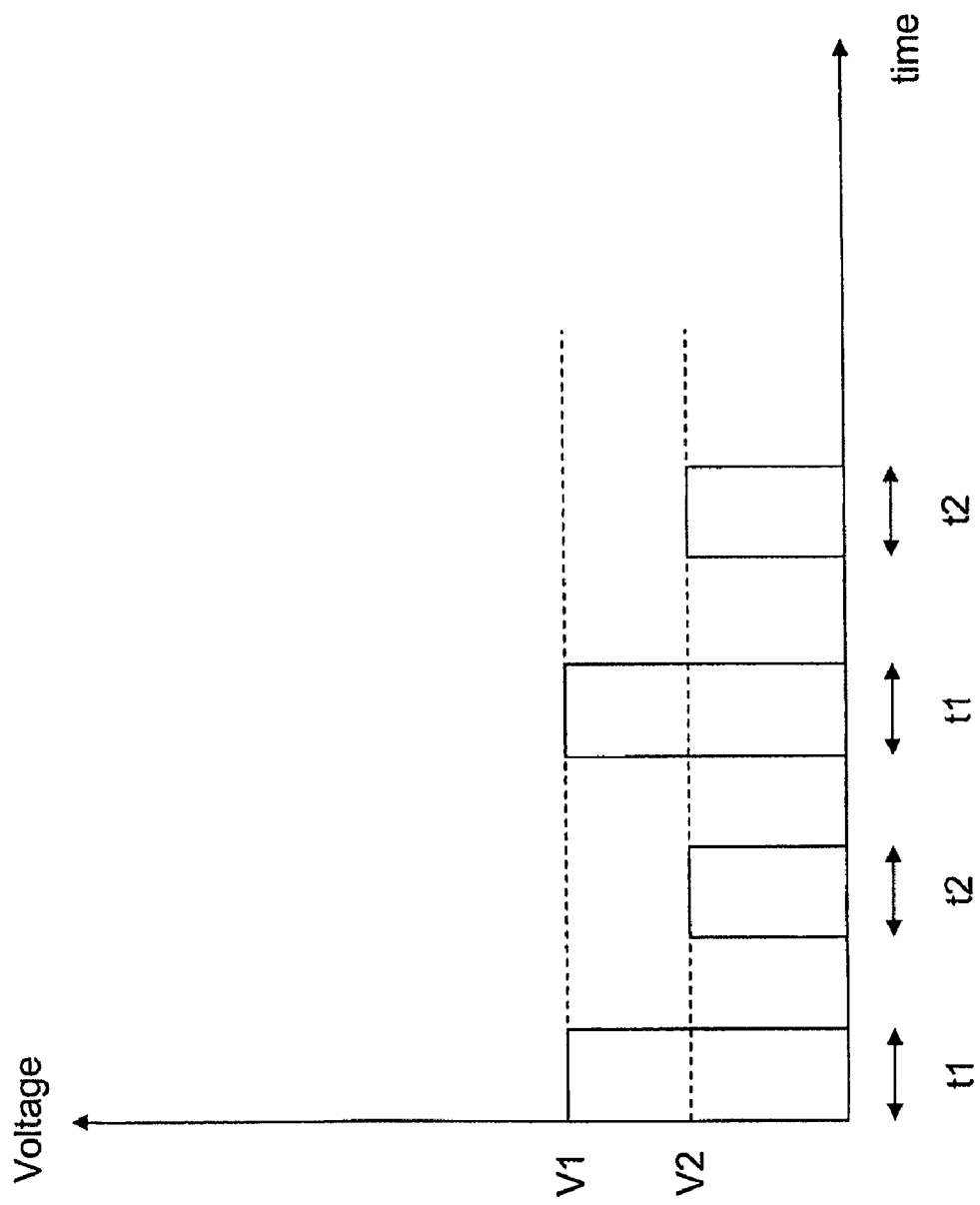
FIG. 3 shows schematically an embodiment of a method for battery system management.

The controller 21 is connected to the DC-to-DC-converter 20, the sensing device 23, and the timer unit 24, and arranged to control the output of the DC-to-DC-converter 20. The DC-to-DC-converter 20 is connected to the input 25 of the first battery 14, to the output 25a of the first battery 14, the input 26 of the second battery 14a, and the output 26a of the second battery 14a. According to this example embodiment, each of the batteries 14, 14a is a 14V battery and the generator is of 28V. Due to the voltage drift of the batteries discussed above, the voltage over the first battery 14 can be approximately 14.5V and the voltage over the second battery 14a can be about 13.5V. The input voltage of the of the DC-to-DC-converter 20 is approximately 28V. Using a conventional equalizer instead of the battery system management device 10, the voltages over the two batteries would have been leveled out, i.e. the voltage over the batteries is about 14V each. In contrast to this, the battery system management device 10 utilizes the voltage imbalance between the batteries in order to, for example, charge at a higher voltage or supply the generator with a higher voltage. Accordingly, the higher voltage of 14.5V of the first battery 14 is utilized. According to one embodiment, see FIG. 3, a switching between the batteries 14, 14a occurs at predetermined intervals, i.e., during a first predetermined period of time t1 the higher voltage V1 of the first battery 14 is applied, which in this embodiment is about 14.5V, and during a second period of time the lower voltage V2 of the second battery 14a is applied, which in this embodiment is about 13.5V. This may, for example, be performed during charging, discharging, or when the batteries are in an idle state. This alternating process is preferably maintained until the batteries are equal in state of charge and, if possible, fully charged. The intervals may have a length of a few seconds to a magnitude of several minutes, for example, 10-20 minutes. According to this embodiment the DC-to-DC-converter 20 is arranged to, when receiving instructions from the controller 21, for example, change the potential of the connection 29 between the batteries 14, 14a upwards or downwards. As the skilled man realizes there are other ways of obtaining these functions, for example, by switching means.

According to a practical example, if a 12V battery is charged with 14V and thereafter is disconnected, the voltage over the battery is about 13.8V the first few seconds. This falls to about 13V after a period of time (5-120 minutes). Accordingly, at charging using the present technology, in a battery system with a charging voltage of 28V and two batteries of 12V each, the imbalance between the batteries can be enhanced so that the first battery 14 has a voltage of 13.3V and the voltage over the second battery 14a has a voltage of 14.7V. Thereby, the battery 14 having a voltage of 13.3V falls rapidly to 13.3V but this is performed without any significant transfer of energy and thereafter the battery is maintained at this level. Over the second battery 14a, the current driving voltage is now 14.7-13.8V =0.9V, i.e. almost a fivefold increase. The charging of the battery is increased at least four times. If alternation between the batteries is performed on a regular basis, typically with 5 seconds to 10 minutes intervals, the increase is halved, but in total the charging speed is at least doubled.

Under certain conditions it may also be described to increase the voltage difference between the batteries, for example, at cold weather conditions which is of frequent occurrence, for example, in Scandinavia. To elaborate, according to the example embodiment shown in FIGS. 1 and 2, if the controller 21 is notified via the temperature sensor 23 that the temperature at the batteries, or outside the vehicle, depending on the placement of the sensor 23, is low, for example, under a predetermined level, which indicates that a higher voltage is desirable. The gas voltage of a battery rises with a decreasing temperature and it is favorable to charge at or near the gas voltage. Thereafter, the controller 21 sends an instruction to the DC-to-DC-converter 20 to control the voltage over the first battery 14 to be higher than the actual voltage of about 14.5V, for example, 15.0V.

Figure 4:
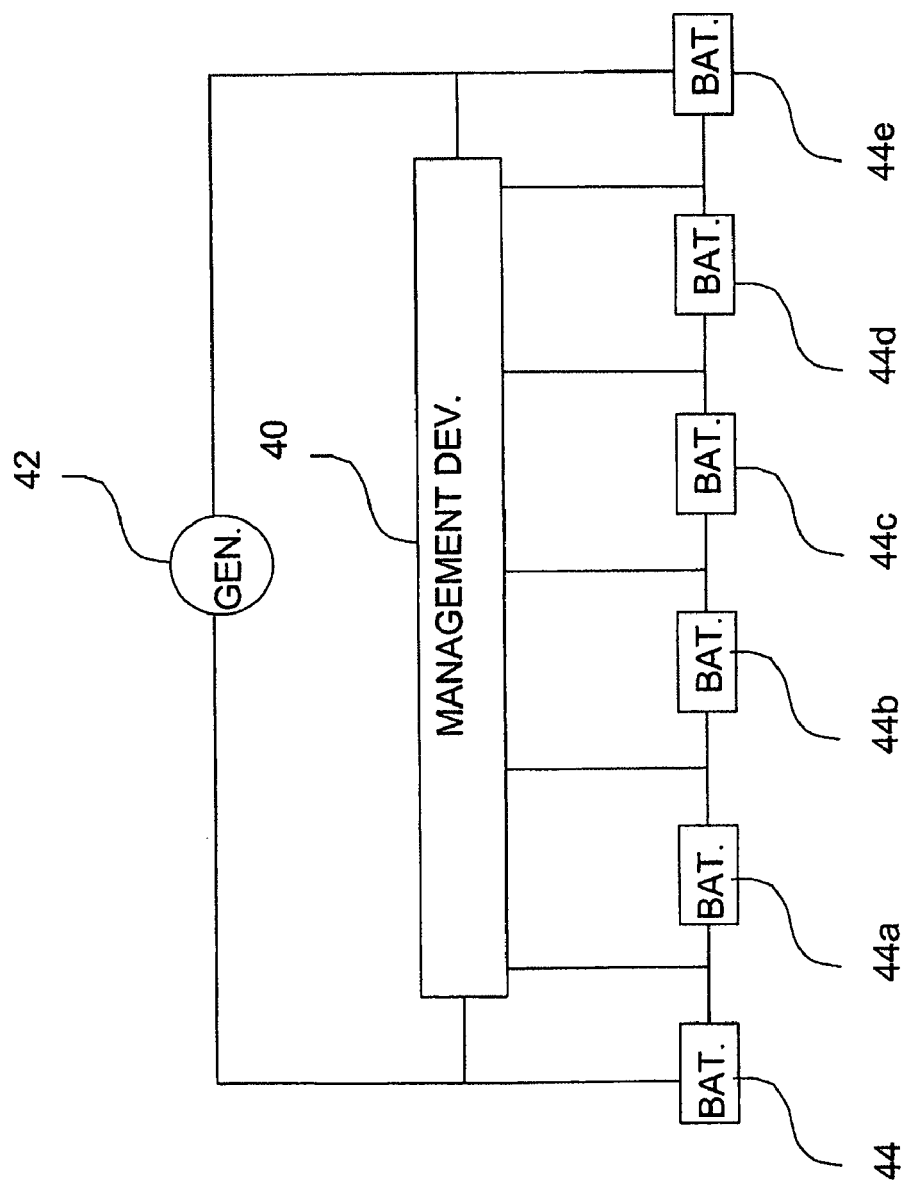
FIG. 4 shows schematically a battery system managing device of a another example embodiment connected to a generator of a vehicle and to a battery system of six serially-connected batteries.
Figure 5:
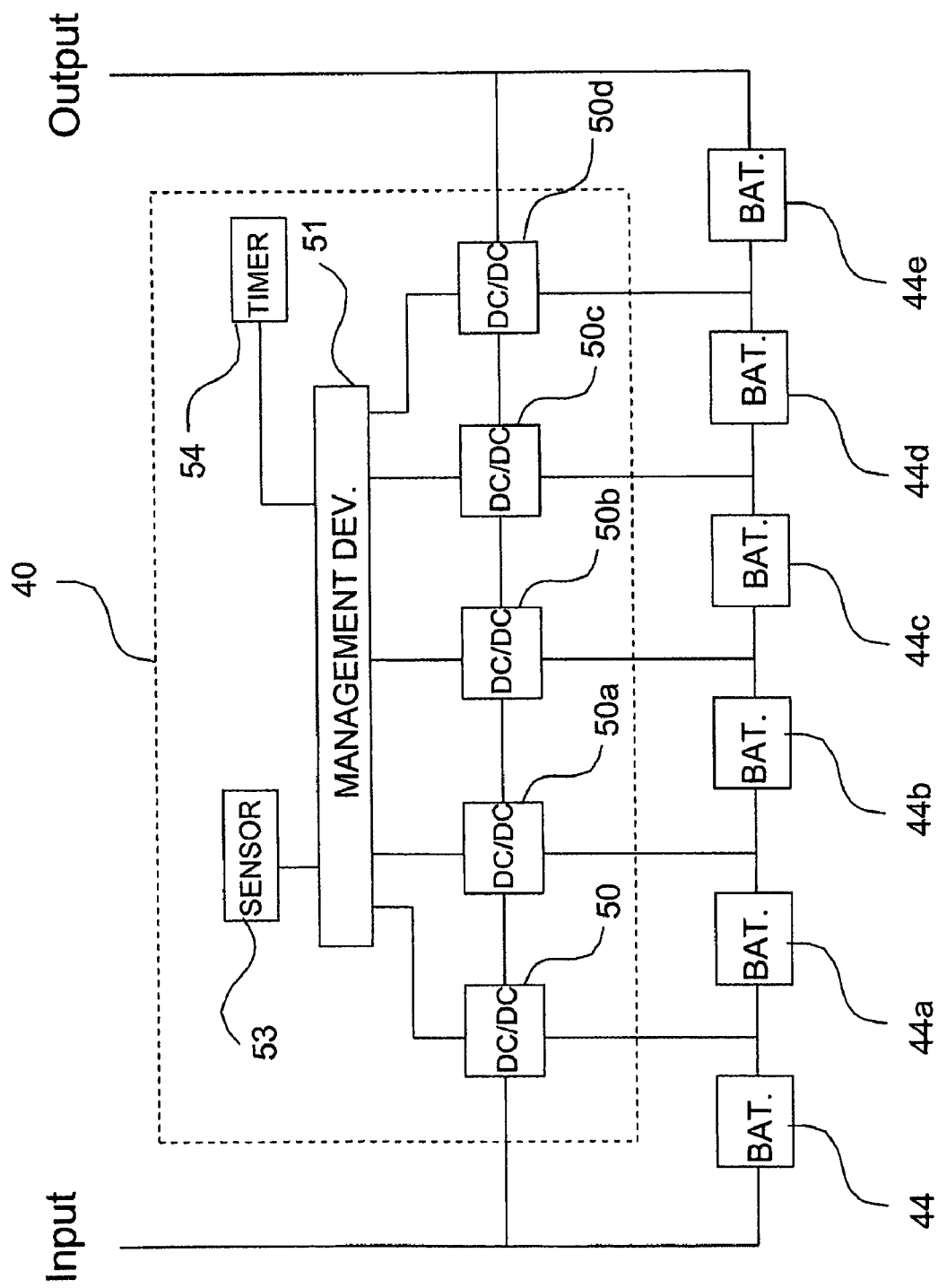
FIG. 5 shows schematically the battery system managing device of FIG. 4 in more detail.

With reference now to FIGS. 4 and 5, another example embodiment of a battery system managing device schematically shown. This embodiment is adapted to be used with a battery system of six serially connected batteries. A battery system management device 40 is connected to a generator 42, alternator or other type of charging device, and to the batteries 44, 44a, 44b 44c 44d, and 44e, respectively, of the battery system or battery string 46 of the vehicle. In this embodiment, the generator is of 36V and the batteries 44, 44a, 44b 44c 44d, and 44e, are accordingly of 6V each. As discussed above, the charging and discharging of such series connected batteries results in a voltage imbalance between the batteries. Thus, the actual voltages over the batteries 14, 14a may, for example, drift so that the voltage over the first battery 44 is about 6.5V, the voltage over the second battery 44a is about 6.3V, the voltage over the third battery 44b is about 6.1V, the voltage over the fourth battery 44c is about 5.9V, the voltage over the fifth battery 44d is about 5.7V, and the voltage over the sixth battery 44e is about 5.5V.

Turning now to FIG. 5, the battery system managing device of FIG. 4 will be shown in more detail. The battery system managing device 40 comprises a first DC-to-DC-converter 50, a second DC-to-DC-converter 50a, a third DC-to-DC-converter 50b, a fourth DC-to-DC-converter 50c, and a fifth DC-to-DC-converter 50d, a controller 51, a sensing or detecting device for sensing or detecting a battery parameter 53, and a timer unit 54. A voltage detector, which in this embodiment is incorporated in respective DC-to-DC-converter 50-50d, is further connected to the controller 51 and to the batteries 44-44e and are arranged to detect the voltage over respective battery 44-44e. As described above, the voltage detector can be arranged stand-alone from the DC-to-DC-converters 50-50d as in the embodiment shown in FIG. 2 indicated with reference numeral 28. Moreover, a power supply (not shown) is included in the device 40 to power the components of the managing device 40, for example, the controller 51 and the DC-to-DC-converters 50-50d. However, in other embodiments the device is powered by the main supply. In this embodiment, the sensing device 53 is a temperature sensor 53 for sensing the temperature at the battery. In certain application, this sensor is not built-in in the battery managing device 10, but placed at a distance from the device itself and wired to the device. In other applications a number of sensors are used in order to sense more than one parameter. In one example, one temperature sensor is provided for each battery. The controller 51 is connected to each one of the DC-to-DC-converters 50-50d, and the timer unit 54, and arranged to control the output of the DC-to-DC-converters 50-50d. The first DC-to-DC-converter 50 is connected to the first battery 44 and the second battery 44a, the second DC-to-DC-converter 50a is connected to the second battery 44a and the third battery 44b, the third DC-to-DC-converter 50b is connected to the third battery 44b and the fourth battery 44c, the fourth DC-to-DC-converter 50c is connected to the fourth battery 44c and the fifth battery 44d, and the fifth DC-to-DC-converter 50d is connected to the fifth battery 44d and the sixth battery 44e.

The operation principles of the device 50 mainly corresponds to the operation of the device described with reference to FIGS. 1 and 2 for that reason it is not repeated.

According to another example embodiment, three batteries are connected in series and the device comprises two DC-to-DC-converters. In this case, each battery has a voltage of 14V and the total generator voltage is 42V. The voltage over the first battery can be placed at 14.5V, the voltage over the second at 13, and the voltage over the third at 14.5V. After, for example, 5 minutes this distribution can be changed so that voltage over the first battery is at 14.5V, the voltage over the second is 14.5V, and the voltage over the third is 13.5V.

Figure 6:
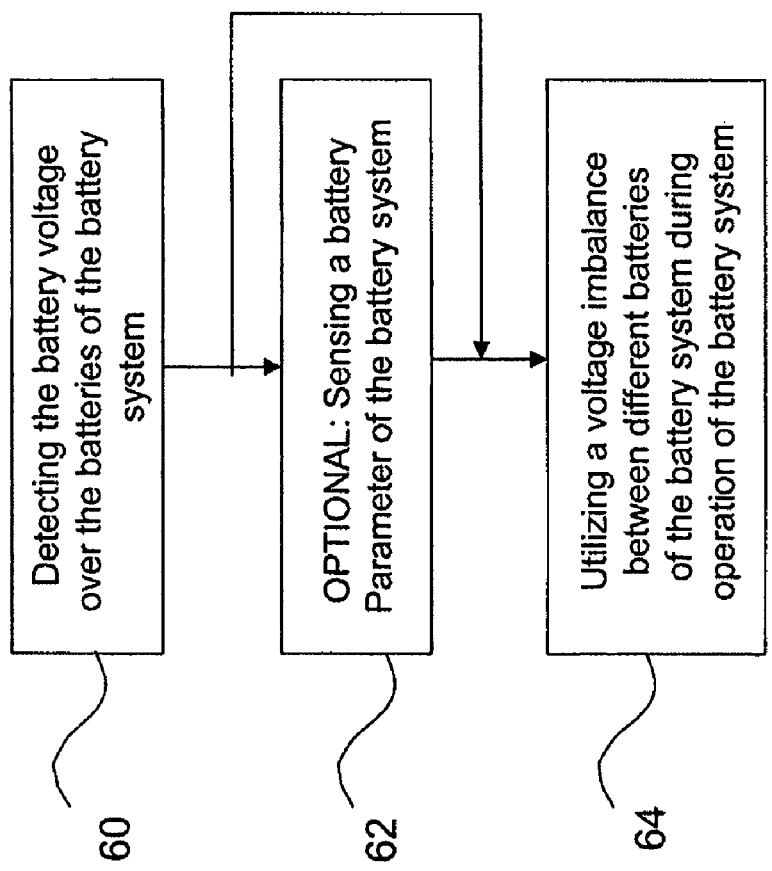
FIG. 6 shows schematically the principles of the method of a first example embodiment.

Referring now to FIG. 6, principles of the method will be described. First, at step 60, a battery voltage over the batteries of the battery system is detected, for example, at the batteries 44-44e shown in FIG. 5. At step 62, which is a optional step, a battery parameter of the battery system is sensed, for example, the temperature. The sensed battery parameter can be used for the control of the voltage distribution of the batteries of the battery system. Then, at step 64, a voltage imbalance between different batteries of the battery system during operation of the battery system is utilized, as described above. According to an embodiment, the voltage distribution of the batteries is controlled in order to create a voltage imbalance between different batteries of the battery system. For example, a detected voltage imbalance between the different batteries of the system can be enhanced and/or alternated between batteries of the battery system having different voltages during predetermined intervals as described earlier. In a preferred embodiment, the voltage imbalance between different batteries of the system is utilized during the charging and/or discharging of the batteries.

Although specific embodiments have been shown and described herein for purposes of illustration and exemplification, it is understood by those of ordinary skill in the art that the specific embodiments shown and described may be substituted for a wide variety of alternative and/or equivalent. Those of ordinary skill in the art will readily appreciate that the technology could be implemented in a wide variety of embodiments, including hardware and software implementations, or combinations thereof. As an example, many of the functions described above may be obtained and carried out by suitable software comprised in a micro-chip or the like data carrier. This application is intended to cover any adaptations or variations of the preferred embodiments discussed herein. Consequently, the present invention is defined by the wording of the appended claims and equivalents thereof.

The invention claimed is:

1. Method for managing a battery system including a number of serially-coupled batteries comprising:

detecting different battery voltages over at least two serially-coupled batteries of the battery system;

controlling the voltage distribution of the two serially-coupled batteries by controlling the potential at an intermediate connection point between the two serially-coupled batteries to purposefully create an applied voltage imbalance between the two serially-coupled batteries of the battery system; and utilizing the applied voltage imbalance between different serially-coupled batteries of the system during operation of the battery system.

2. Method according to claim 1, further comprising:

using the applied voltage to charge one of the two serially-coupled batteries at a first charging voltage based on the detected battery voltage for the one battery and to charge the other of the two serially-coupled batteries at a second different charging voltage based on the detected battery voltage for the other battery.

3. Method according to claim 1, wherein the step of controlling the voltage distribution comprises:

controlling the voltage distribution of the serially-coupled batteries to enhance a detected voltage imbalance between the different serially-coupled batteries of the system.

4. Method according to claim 1, further comprising:

alternating between serially-coupled batteries of the battery system having different voltages during predetermined intervals.

5. Method according to claim 1, wherein the step of utilizing the voltage imbalance comprises:

utilizing the voltage imbalance between different serially-coupled batteries of the system during the charging and/or discharging of the serially-coupled batteries.

6. Method according to claim 1, further comprising:

sensing a battery parameter of the battery system; and utilizing the sensed battery parameter for the control of the voltage distribution.

7. Method according to claim 4, wherein the step of sensing a battery parameter comprises:

sensing the temperature at the battery system.

8. A computer-readable medium comprising instructions for bringing a computer to perform a method according to claim 1.

9. A device for managing a battery system including a number of serially-coupled batteries, comprising:

voltage detecting means connected to said battery system and arranged to detect the battery voltage over the serially-coupled batteries of the battery system;

DC-to-DC-converting means connected to said battery system; and a controller connected to said voltage sensing means and to said DC-to-DC-converting means and being arranged to control the voltage distribution over the serially-coupled batteries of the battery system via said DC-to-DC-converting means by controlling the potential at an intermediate connection point between the two serially coupled batteries to purposefully create an applied voltage imbalance between different serially-coupled batteries of the battery system.

10. Device according to claim 9, further comprising means for sensing a battery parameter of said battery system connected to said controller and wherein said controller is arranged to utilize said parameter at said control of the voltage distribution.

11. Device according to claim 10, wherein said means for sensing a battery parameter is a temperature sensor for sensing a temperature at said battery system.

12. Device according to claim 11, further comprising a timer unit connected to said controller.

13. A device according to claim 9, wherein the controller is arranged to use the applied voltage to control the voltage distribution over the serially-coupled batteries of the battery system via said DC-to-DC-converting means to charge one of the serially-coupled batteries at a first charging voltage based on the detected battery voltage for the one battery and to charge an other of the serially-coupled batteries at a second different charging voltage based on the detected battery voltage for the other battery.

14. A device for managing a battery system including multiple serially-coupled batteries, comprising:

a voltage detector arranged to detect the battery voltage for a first battery and a second battery in the battery system, which first and second battery are serially-coupled;

a battery charger; and a controller connected to the voltage detector and to the battery charger and being arranged to receive from the voltage detector a first detected voltage for the first battery and a second detected voltage for the second battery that is different than the first detected voltage, the controller being further arranged to control the battery charger to charge the first battery at a first charging voltage based on the first detected battery voltage and to charge the second battery at a second different charging voltage based on the detected second battery voltage by controlling the potential at an intermediate connection point between the two serially coupled batteries.

15. The device according to claim 14, wherein the battery charger is a DC-to-DC converter.

16. The device according to claim 14, further comprising means for sensing a battery parameter of said battery system connected to said controller and wherein said controller is arranged to utilize said parameter when controlling charging of the first and second batteries.

17. A device according to claim 16, wherein said means for sensing a battery parameter is a temperature sensor for sensing a temperature at said battery system.

18. The device according to claim 14, wherein the first charging voltage is near a first gas voltage associated with the first battery and the second charging voltage is near a second different gas voltage associated with the second battery.

19. A device according to claim 14, wherein the controller is arranged to use the applied voltage to control the voltage distribution over the serially-coupled batteries of the battery system via a DC-to-DC-converting means to charge one of the serially-coupled batteries at a first charging voltage based on the detected battery voltage for the one battery and to charge an other of the batteries at a second different charging voltage based on the detected battery voltage for the other battery.

* * * * *